Figure 9:
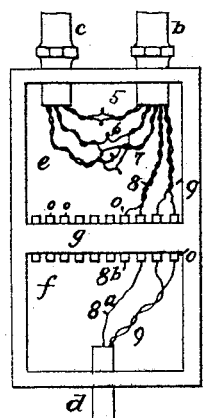

(No Model.) 2 Sheets—Sheet 1.
J. N. KELLER & J. A. McCOY.
CABLE BOX FOR ELECTRIC WIRES.
No. 459,523. Patented Sept. 15, 1891.
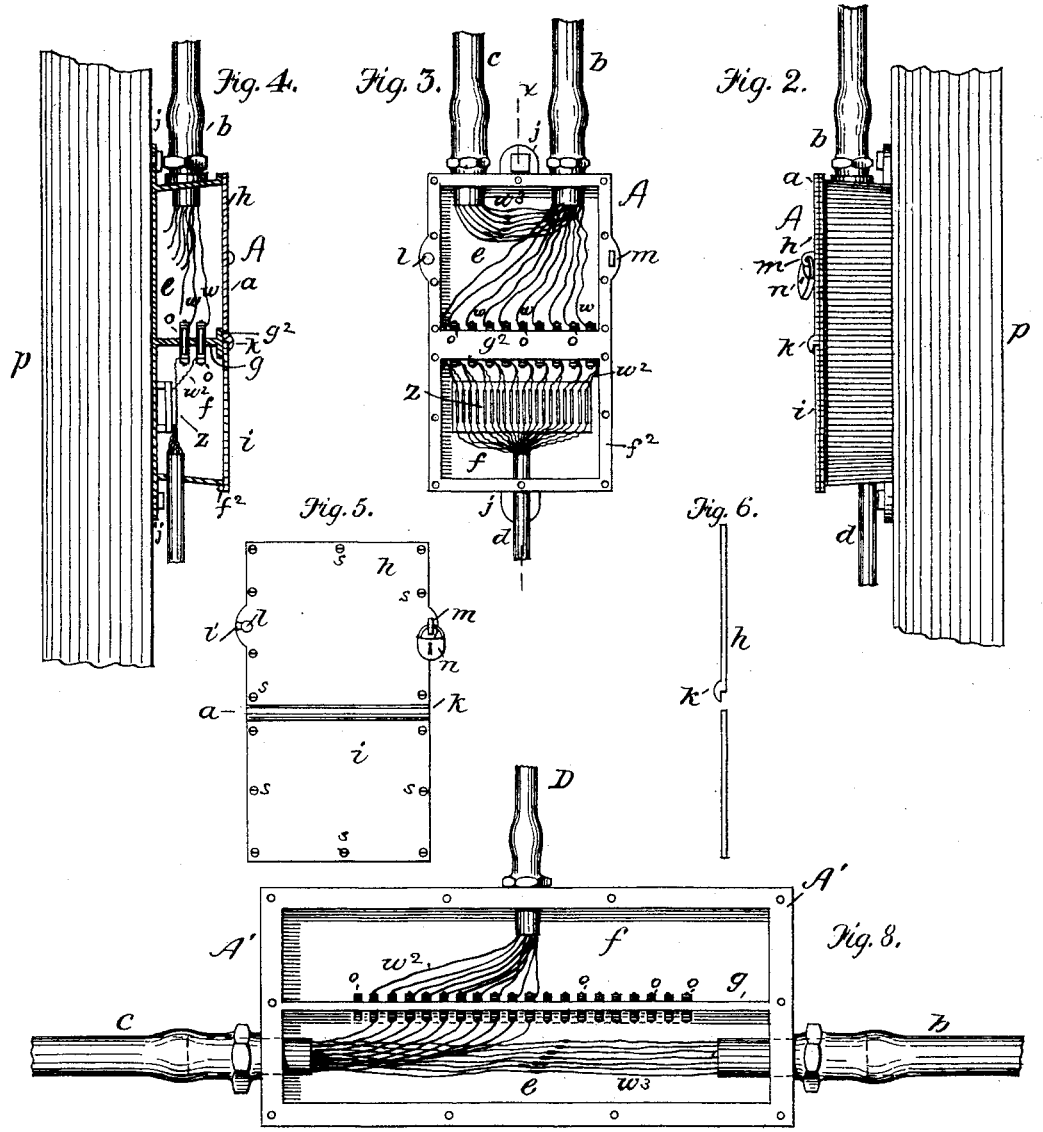

(No Model.) 2 Sheets—Sheet 2.

J. N. KELLER & J. A. McCOY.
CABLE BOX FOR ELECTRIC WIRES.

No. 459,523. Patented Sept. 15, 1891.

WITNESSES

INVENTORS

UNITED STATES PATENT OFFICE.

JASPER N. KELLER, OF NEWTON, AND JOHN A. McCOY, OF SOMERVILLE, ASSIGNORS TO THE NEW ENGLAND TELEPHONE AND TELEGRAPH COMPANY, OF BOSTON, MASSACHUSETTS.

CABLE-BOX FOR ELECTRIC WIRES.

SPECIFICATION forming part of Letters Patent No. 459,523, dated September 15, 1891.

Application filed May 23, 1891. Serial No. 393,821. (No model.)

*To all whom it may concern:*

Be it known that we, JASPER N. KELLER, residing at Newton, and JOHN A. McCOY, residing at Somerville, in the county of Middlesex and State of Massachusetts, have invented certain Improvements in Cable-Box and Distribution Systems, of which the following is a specification.

Our invention relates to the disposition of electric-line conductors which are arranged in cables, and more especially to a convenient mode or plan of partial or way distribution of such conductors, to means for carrying the said mode into effect, and to arrangements for cross-connecting the conductors of a number of twisted pairs for the purpose of breaking up and diminishing the effects of induction while the said members of the said pairs are used individually.

In constructing systems of telegraphic and telephonic conductors, and particularly the latter, it is very convenient to employ multiple-conductor cables. The subscribers' stations of a telephone system are irregularly distributed and are often, without design, arranged in what may be considered separate groups at varying distances from the central station. One group of stations, for example, may be located four hundred yards, a second six hundred yards, a third half a mile, and a fourth a mile from the central station, but all in the same general direction. Heretofore and prior to our invention under such circumstances it has been necessary either to run a cable comprising the requisite number of conductors for the supply of the stations of all the groups as far as the first group and there, after making the first distribution, end the cable and run uncabled or separate line-wires on poles or other supports to the more distant groups or to run at the outset a larger number of smaller cables from the central station to the several groups, respectively. There are practical objections to both of these plans. The first involves the maintenance and construction of a large number of separate pole line-wires, which are unsightly and which in many places, particularly suburban towns and cities, are strenuously objected to by residents, and which, moreover, in places where there are many trees are difficult to keep in order. The second is expensive, because a given number of conductors distributed between a plurality of small cables cost much more than an equal number comprised in a single large cable, and also because the actual length of cable required would be much more. By our invention it becomes possible and easy to run a sufficiently large cable to the location of the first group, there distributing as many conductors as are required for the supply of the said group, to extend from thence a continuation-cable comprising the conductors of the groups beyond as far as the second group, where the next distribution is made, and so on, making successive partial distributions and reducing the number of cable conductors until the final group is reached. The best cables now made are formed by separately covering each conductor with cotton, paper, or other fiber, by inclosing these together in some such tight and dense protecting-envelope as a lead pipe, and by providing that the spaces which necessarily are left between the several conductors shall be filled with paraffine or similar substance or by perfectly dry air. In either case it is essential to the efficiency of the cable that moisture must be absolutely prevented from having access to the ends of the cable. When it penetrates into the covering-envelope, insulation at once rapidly deteriorates and the several circuits seriously interfere with each other. The employment in telephony of cables in which dry air only is employed in association with cotton or paper as the dielectric is often preferable, these possessing an especially low electrostatic capacity; but such cables are much more liable to admit moisture when their ends are exposed, and thereby to have their insulation deteriorated, than are those which are permeated with some such insulating medium as paraffine, which, as it were, tends to seal up the ends. When such dry-air cables are used, it is therefore very desirable that frequent access to or careless manipulation of the cable ends shall be avoided, and our invention provides a means whereby conductors of a cable once set up may be easily manipulated, cross-connected, continued, or handled for any purpose without exposing the cable to deterioration from the access of moisture. Metallic telephone-circuits are now coming into extensive use. Cables which are employed in connection with such metallic circuits have their several conductors made up in twisted pairs in a manner well understood; but the change from single or earth-completed circuits to metallic circuits ordinarily takes places gradually and it is therefore a desideratum that such cable conductors of the twisted pairs as are not used for metallic circuits shall be capable of being employed in single-wire circuits. If so used, unless means be adopted to prevent the induction and consequent interference between the two members of any twisted pair, these serving, respectively, as conductors for independent circuits, disturbance resulting from the above causes is introduced and is very severe, because the said two members of said twisted pair are brought into a position well adapted to reciprocally disturb each other in virtue of the very means, viz., the parallelism and twisting, which in a metallic circuit are adapted to effect neutralization. In practice, therefore, except for very short distances, it has been found requisite in order that this interference may be kept down to dissever the intimacy of the members of each twisted pair at intervals by cutting one of them and by connecting the two severed ends thereof with the corresponding severed ends of another similarly-divided conductor, whereby each conductor has its continuity and direction properly maintained, while its contiguity to one only of the other wires of the cable ceases, it being thereby caused to change its place in the cable, considered as a whole, and to be in closest proximity now to one and now to another of the conductors.

Our invention comprises, in view of the above considerations, a system for the partial or way distribution of the conductors of a multiple-conductor cable, a cable head or box which enables the said distribution to be effectuated without damage to the condition of the cable, a combination-box having separate compartments, one of which is appropriated to through conductors and the other to way conductors, the said two compartments being capable of electrical communication with each other, but which are hermetically sealed from each other, so that the necessarily frequent openings of the way-compartment will not in any way interfere with or tend to admit moisture to the through conductors; also, in the construction of a suitable cable or junction box in which the transposition of conductors for the dispersion of the effects of induction may conveniently be performed without requiring the cable itself to be opened, and in certain details of construction, which are more specifically pointed out in the several claims.

Figure 11:
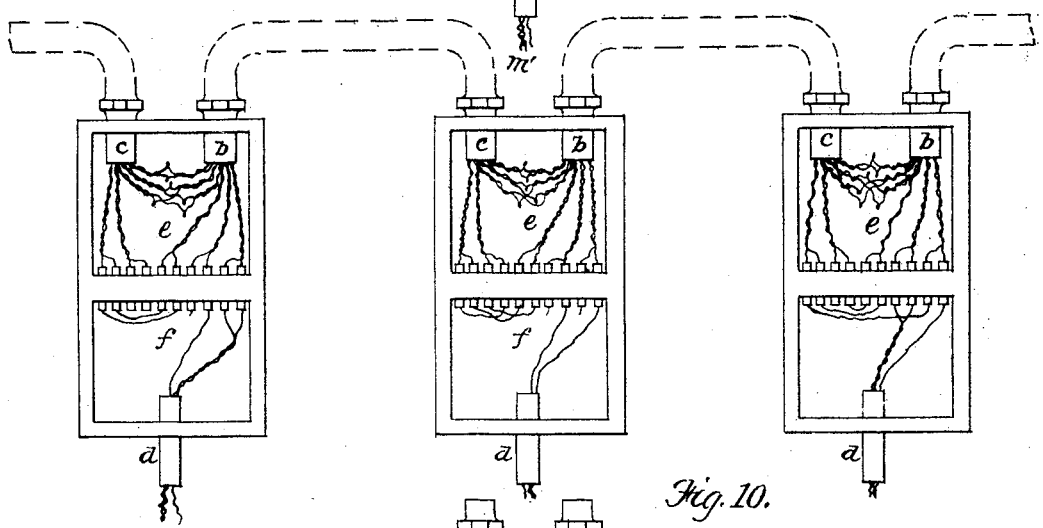
Figure 10:
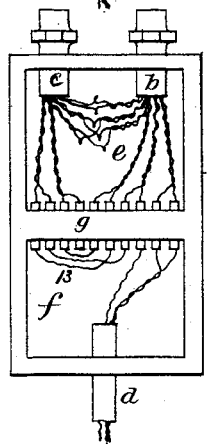

In the drawings which illustrate and form a part of our specification, Figure 1 shows a portion of an overhead cable with branch cables and combination cable-boxes constructed in accordance with our invention. Fig. 2 is a side elevation of our combination cable-box mounted on a pole or other support. Fig. 3 is a front elevation of the same with the cover removed. Fig. 4 is a side elevation in section on line $x$ $x$ of Fig. 3. Fig. 5 is a representation of the front of the junction-box with the cover in place. Fig. 6 is an edge view of the two parts of said cover, indicative of their mechanical relation. Fig. 7 is a detail showing in longitudinal section one of the fixed insulated conducting-bolts for making the conductor connections between the two chambers or compartments of our box. Fig. 8 is a plan view, with the cover removed, of a modified combination-box, which is preferable for use in connection with underground cables. Figs. 9 and 10 are diagrams indicating some of the modes of interconnecting conductors by means of our combination-box; and Fig. 11 is a diagram forming an amplification of Fig. 1, showing the interiors of three boxes arranged serially in connection with a main cable and provided with branch cables to supply groups of sub-stations, the several modes of arranging the wires within the boxes being indicated here also.

In Fig. 1, $c$ is a main cable extending from a central station and suitably suspended upon poles $p$. The said cable at convenient intervals passes through combination-boxes A, within which its conductors may be rearranged, carried on to the next length without rearrangement, led in part to corresponding conductors of branch cables, or otherwise manipulated, and from the said boxes branch cables $d$ and $d'$ are extended, leading to groups of sub-stations, the said branch cables comprising, of course, a number of conductors smaller than that of the main cable.

Referring now to Figs. 3, 4, 5, 6, and 7, we will describe our combination cable-box, which may, however, with equal propriety be termed a "junction-box" or a "cross-connection box." In the figures, A is a metal box conveniently made of cast-iron and of substantially rectangular cross-section. It is divided by a partition $g$, preferably cast integrally with the body of the box and having a T-flange $g^2$ at its outer edge. The box itself is also provided with a similar flange $f^2$, which surrounds its entire edge. It will be seen that the partition $g$ divides the box into two separate chambers $e$ and $f$. The box A has a metal cover $a$, formed of two pieces $h$ and $i$, the upper of which is shouldered and flanged at $k$, so that it may overlap the upper edge of the lower, as clearly shown in Figs. 2, 4, and 6. Each of these plates is adapted to close its own compartment and is capable of being secured to the flanges of the box by suitable screws $s$, a gasket being first placed between the said plate and the flange of the box in a manner well understood. The plate $i$ is fastened directly by the screws $s$; but the plate $h$ has a slotted hole $l'$ at one edge, whereby it is hung on a pin $l$, projecting from the box-flange, and on the opposite flanged side a lock-hasp $m$ projects through a hole in the cover, whereby the said cover may be secured by a padlock $n$. The base of the box A has projecting lugs $j$ at the ends, and by means of holes through the said lugs the box can be bolted to a pole $p$ or other suitable support. The outgoing and incoming ends of the main cable enter the upper compartment $e$ at the top of the box, which is perforated for that purpose and fitted with brass screw-pipe terminations $b$ and $c$, to which the lead-covered cables containing any desired number of insulated wires may be attached by a wipe-joint. At these points the box is therefore tight, the pipe-screw being luted, if necessary. In the present instance it is assumed that the cable entering at $b$ is one of thirty pairs, while the continuing cable leaving at $c$ may of course be smaller, as some of the conductors of the entering cable are required to be led off at this box to supply a group of sub-stations. To provide for the partial distribution occurring at this point a hole is bored in the bottom end of the box into the lower chamber $f$ and the end of a smaller cable $d$ (large enough, however, to supply the group it is destined to serve) is passed through into the said chamber. It will now be seen that the office of the upper, which is also usually the larger, chamber is to afford space and facilities for dividing the conductors of the entering cable, which are to be distributed at this point for local service, from those which are to go through and for performing any other changes in the arrangement of the several conductors which are desired.

It is found desirable in practice that the superintendent in charge shall be able to check and have personal knowledge of such changes as are at any time made, and as each change necessitates an opening of the chamber and a liability of admitting moist air, which may adversely affect the main cables, it is advisable, in order to avoid unnecessary openings, to make rearrangements as rarely as possible. Such operations, therefore, are usually performed by specially skilled persons and are so designed that changes are infrequently required. These then are the reasons for having the compartment $e$ locked, and in virtue of them the key may be kept by the superintendent.

In the figures such of the conductors as are for through lines are designated by $w^3$ and are simply spliced and led straight from $b$ to $c$ within chamber $e$. Such as are for local distribution to supply an adjacent group of stations are otherwise disposed of, as will now be specified. A suitable number of connection-bolts $o$, provided at each end with binding-screws $q$ and jam-nuts $r$, are mounted within the partition $g$. Each is insulated by a non-conducting sleeve 4 from the substance of the partition. By connecting such wires $w$ of the incoming main cables as are to be distributed locally to the ends of the bolts $o$ in chamber $e$, it is evident that they are now extended into the lower chamber $f$ and can there be united to the wires $w^2$ of an ordinary local cable, as shown. By this arrangement all ordinary tests, connections, disconnections, and changes required in any work can readily be made by the regular linemen, who can open the chamber $f$ by removing the screws $s$, it not being locked, and who can do this without any danger of injuring the insulation of the main cables, since though moist or damp air may enter the lower chamber it is prevented from entering the upper chamber by the air-tight partition $g$. The lightning-arresters and other protecting appliances $z$ can be placed, as indicated, in the chamber $f$ and be secured to the back thereof.

In Fig. 8 we show a combination-box A', better adapted in some respects for underground work. The box itself is similar in form, but the partition $g$ runs from end to end, instead of from side to side. The main cable $b$ runs in through an air-tight passage at one end, while the continuation thereof $c$ leaves by an air-tight passage at the other end. Both chambers $e$ and $f$ are lengthwise of the box. The through wires $w^3$ thus have a straight run through the box, while the egress for the local cable D is placed at the middle of their chamber $f$. The connection-bolts $o$ are mounted in the partition $g$, as in the former case, but are in a single rank, while in the box A they are paired, as indicated in Fig. 4, or are in two ranks. There is therefore more room to work in the box A' of Fig. 8, as is of course required in underground work. The connector-sleeves are so fixed in the partition $g$ that they are air-tight, and in all cases the two chambers must be hermetically sealed from each other and closed from the air. It is to be assumed that each main cable has many twisted pairs of conductors. Thus in Fig. 3 cable $b$ may have thirty pairs, and ten of these may be drawn off to cable $d$ through the bolts $o$, while $c$ would be a twenty-pair cable running onward to the next box; but we have shown in each case, for the sake of clearness, but few conductors.

Figs. 9 to 11 are illustrative of the adaptability of our combination-box to cross-connections and other necessary manipulations. We have indicated the necessity of breaking up twisted pairs in cases where their members are to be used as independent or earth-completed circuits.

In Fig. 9, A is the combination or connection box; $g$, the cross-partition; $e$, the lock-chamber; $f$, the local chamber, and $o$ the connecting-bolts. $b$ and $c$ are the two sections of the main cables, and $d$ is the local distribution-cable. Two of the original twisted pairs 8 and 9, coming in on cable $b$, are shown as assigned to local distribution by way of the bolts $o$. One of these 9 is evidently a metallic circuit to the end and connects with a twisted pair m' in cable d. The other 8 connects with a single-wire circuit of cable d by wire 8ᵃ, while its mate 8ᵇ ends for the present in the bolt o, or, if desired, may be united to another single wire in cable d. The through circuits (represented by 5, 6, and 7) in like manner may comprise metallic and single-wire circuits. If metallic, they continue paired, as 5. If single wire, the members of the pairs are cross-connected or have their places interchanged, the two wires of each pair (when serving as conductors for earth-completed circuits) from cable-section b being connected to two wires of different pairs in section c, as shown in the drawings, where one wire of pair 6 in the box is connected with one of pair 7, the converse also being true. The close inductive proximity of any two wires is thus reduced to comparatively short sections. We have shown a sufficient number of circuits to exemplify the principle.

Another mode of connection and cross-connection is disclosed in Fig. 10. The box, its separate chambers, its in and out main cable sections are the same as in the preceding example. From the cable-section b of the main line, as will be seen, twisted pairs for metallic circuits complete may be led off to the local-group cable d. Single wires, each forming in cable b a member of some twisted pair, may also be continued by way of the insulated bolts o to the group-cable d. The remaining conductor of any twin pair may be left connected to the bolt o in chamber e, as in Fig. 9, or connected with another single wire in d; or again, as shown, it may, by way of other bolts o, form a connection with a single wire of a second pair in the continuation c of the direct or main cable. The bolts o in this case, together with short connecting-wires 13, thus constitute a convenient cross-connection expedient. Moreover, in this box, also, some of the metallic circuits (represented by the uppermost one in chamber e) are continued through from b to c without passing through the bolts o, while other pairs are cross-connected for single-line work. The box also affords a convenient means whereby outward stations can communicate permanently with stations supplied by cable d, as is shown in wire 13 in both chambers.

Fig. 11 needs no particular description, it being simply an illustration of the principles already laid down and showing several successive boxes connected with a single main line of cable having successively-arranged sections, the several sections being decreased in size and capacity in the order of their outward progression, and of the several arrangements and cross-connections which can be conveniently made in the said boxes. The partition g in all cases may of course, if desired, be made of non-conducting material, in which case the bolts o will not require to be individually insulated.

Having now described our invention, we claim—

1. In a system of cabled conductors, the combination of two or more sections of main multiple-conductor cable, one or more lateral branch cables, and a combination connection-box located at the junction of the said cable-sections and the branch cable, having two chambers divided from each other by an impervious partition, but capable of being electrically connected by insulated connection-bolts passing through the said partition, independent covers being provided for the said chambers, the consecutive sections of main cable being connected by air and water tight entering-joints with one chamber and the branch cable being similarly connected with the other chamber, substantially as and for the purposes set forth.

2. A system of partial or way distribution of cable conductors, comprising a series of junction-boxes, each having two separate compartments hermetically sealed from but capable of electrical communication with each other by means of connection-conductors passing through the dividing-partition, a series of sections of main or through cables extending from a suitable section through one of the chambers of the said boxes to the end of a route, the connection between the conductors of each cable-section and its continuation being made in the box-chamber entered by both, and a branch cable at each junction-box adapted to serve a group of sub-stations and connecting with and entering the remaining chamber of the said box and having its conductors united by means of the connection-conductors of the said box with a portion of the conductors of one or both of the main cables, substantially as and for the purposes set forth.

3. A system of partial or way distribution of cable conductors leading from a central station to sub-stations located in several groups, comprising a series of combination junction-boxes, each having two separate compartments hermetically sealed from but capable of electrical communication with each other by means of connection-conductors passing through the dividing-partition and provided each with an independent cover, a main-cable section entering one of the said chambers of each box from the direction of the central station and inclosing a maximum number of conductors, a continuation main cable having a smaller number of conductors also entering the same box-chamber and leading therefrom to the next box and having its conductors connected with a portion of the conductors of the first section, and a branch cable serving a group of sub-stations entering the remaining chamber of each box and having its conductors united through the connection-conductors of the dividing-partition with the remaining portion of the conductors of the first section of main conductor, substantially as and for the purposes set forth.

4. A cable head or box having two separate chambers hermetically divided from each other by means of an intersecting partition and closed by separate and independent gasketed covers, but electrically united by insulated connection-screws mounted in and passing through said partition, in combination with incoming and outgoing main-cable sections entering one of the said chambers through air and water tight joints and having some of their conductors united therein for through communication and a branch cable entering the other chamber in like manner, the conductors of the said branch cable being connected with those of either main cable by means of the insulated screw connections in the chamber appropriated to said branch, whereby the opening of the main-cable chamber is made unnecessary, substantially as and for the purposes set forth.

5. A combination cable-box having separate compartments for through and way conductors, divided from each other by an impervious and tight partition, through which pass electrical screw connections, and each provided with a separate and independent tight cover whereby either can be separately opened, one of the said compartments being furnished with a lock and having two air and water tight openings for the introduction of two sections of main cable, some of the conductors of which may be connected together in said compartment for through communication, while others may be connected with the screw connections of the dividing-partition, the other compartment having an opening for the admission of a third cable-section for way-distribution, the several conductors of said cable being adapted for union with a portion of those of either main cable through the said partition connection-screws, whereby the opening of the branch-cable chamber alone is required for the rearrangement of branch conductors, as described herein.

6. A cable-box or cable-head having a main-cable chamber and a branch-cable chamber divided from each other by an air and water tight partition, but adapted for electrical communication by connection screws or bolts passing through said partition, a main cable entering the said main chamber and having a portion of its conductors connected therein with the conductors of a continuation main cable leading from the said chamber and having the remaining portion thereof connected with the said partition connecting-screws, and thereby terminated in the branch-cable chamber for the purpose of way-distribution by means of a local cable entering said chamber, substantially as described.

7. A combination junction and cross-connecting cable-box having a partition dividing it into two distinct chambers, each of which has an independent cover adapted to be placed at the junction of a branch with a main cable, one of the said chambers having two openings for the incoming and outgoing sections, respectively, of the main cable and the other chamber having a single opening for the branch cable, together with a series of connection-bolts provided at each end with terminal screws extending through the said partition, whereby the branch conductors in one chamber may be connected with the main conductors in the other and whereby the several conductors of any or all of the said cables or sections may be cross-connected, substantially as specified.

8. A combination cable-box for effecting the junctions of main and branch cables, made with two distinct and separate compartments, the said two compartments being divided by a partition in which are mounted connection-bolts extending from one side to the other thereof, connections between the conductors of the incoming and outgoing main cables being made direct in that one of the said chambers which both of the said cables enter, while the said main-cable conductors are enabled to connect with the branch-cable conductors in the other chamber by means of the said connection-bolts, substantially as described.

9. A combination-box for multiple-conductor cable-junctions, divided by means of a tight partition into two separate chambers, one of which is entered by the incoming and outgoing main-cable sections, while the other is entered by the branch cable, combined with a series of insulated connection bolts or screws mounted in and extending through the said partition and constituting means for electrically connecting the said two chambers and their respectively entering cables, and also a convenient means for the cross-connection of both way and through conductors, as specified.

10. An iron junction and connection box for electric cables, provided with a partition made integrally therewith and thereby divided into two separate chambers and having two openings into one and one opening into the other of said chambers for the admission of cables thereto, the said partition having connection-bolts whereby the conductors of cables entering the said chambers respectively may be united, and the said two chambers being each provided with a separate lid or cover, one being secured in place by screws only and the other by a lock, substantially as described, and for the purposes specified.

In testimony whereof we have signed our names to this specification, in the presence of two subscribing witnesses, this 13th day of May, 1891.

JASPER N. KELLER.
J. A. McCOY.

Witnesses:
GEO. WILLIS PIERCE,
JOSEPH A. GATELY.